United States Patent [19]
Kimura

[11] Patent Number: 5,406,841
[45] Date of Patent: Apr. 18, 1995

[54] FLOW SENSOR

[75] Inventor: Mitsuteru Kimura, Miyagi, Japan

[73] Assignee: Ricoh Seiki Company, Ltd., Tokyo, Japan

[21] Appl. No.: 33,783

[22] Filed: Mar. 17, 1993

[30] Foreign Application Priority Data

Mar. 17, 1992 [JP] Japan .................................. 4-091599
Mar. 17, 1992 [JP] Japan .................................. 4-091600

[51] Int. Cl.⁶ .............................................. G01F 1/68
[52] U.S. Cl. .................................................. 73/204.26
[58] Field of Search ........... 73/204.16, 204.18, 204.25, 73/204.26

[56] References Cited

U.S. PATENT DOCUMENTS 4,542,650  9/1985  Renken et al. ............... 73/204.26 X
4,651,564  3/1987  Johnson et al. ................. 73/204.26

FOREIGN PATENT DOCUMENTS 2-193019 of 1990 Japan .
4069521 3/1992 Japan .

Primary Examiner—Herbert Goldstein
Attorney, Agent, or Firm—Lowe, Price, LeBlanc & Becker

[57] ABSTRACT

A flow sensor is disclosed, which has a thin film heater which is formed atop a cavity formed in the substrate, and the thin film heater is formed on its upstream and downstream sides with slits for separating it and temperature sensors from the substrate. The slits have such a small width that a laminar flow of gas can be maintained. In the case where the film heater has a positive resistance temperature coefficient, the thin film heater is disposed such that current flows in a direction of the gas stream, in case when the film heater has a negative temperature coefficient, the thin film heater is disposed such that current flows in a direction perpendicular to the gas stream.

8 Claims, 2 Drawing Sheets

FLOW SENSOR

FIELD OF THE INVENTION

This invention relates to a flow sensor for detecting slight velocity of gas, and more particularly, to a flow sensor thermally and electrically separates a thin film heater and substrate and does not cause formation of vortex flow of gas.

BACKGROUND OF THE INVENTION

When a heater is placed in a gas stream, the upstream side of the heater is cooled, while the downstream side is warmed by heat carried by the gas stream. It is thus possible to detect the gas velocity by measuring the temperature difference between the upstream and downstream sides of the heater. A flow sensor has been proposed, in which a temperature sensor is disposed on each of the upstream and downstream sides of a micro-heater (as disclosed in, for instance, Japanese Patent Laid-Open No. 193019/90).

In the conventional flow sensor, a thin film supporting a heater had large openings formed on the upstream and downstream sides to let both its upper and lower surfaces be exposed to the gas stream. These large openings cause turbulent flow of gas. Therefore, the relation between the temperature difference and gas velocity can not be obtained from a simple formula, but a cumbersome calibration is required.

SUMMARY OF THE INVENTION

An object of the invention is to permit the relation between the temperature difference and the gas velocity to be readily derived from a simple formula by thermally and electrically isolating a thin film heater from the side of a substrate and maintaining a laminar flow of gas to prevent vortex flow and also improving the accuracy of the flow sensor by providing slits on the upstream and downstream sides of the thin film heater such as to prevent escapement of Joule heat generated in the thin film heater to the substrate side and also prevent leakage of current through the thin film heater to the substrate side, and also improving the sensitivity of the flow sensor by detecting the temperature difference between the upstream and downstream side of the heater.

The flow sensor according to the invention is like the conventional flow sensor so long as the upstream and downstream side temperatures of the thin film heater exposed to the gas stream are measured with respective temperature sensors to detect the gas velocity from the temperature difference.

According to the invention, however, the thin film heater is formed atop a cavity formed in the substrate, and the thin film heater is formed on its upstream and downstream sides with slits for separating it from the substrate. The slits have such a small width that a laminar flow of gas can be maintained.

When a heater is disposed in a laminar flow of gas, the quantity $\Delta Q$ of heat robbed from the heater by the gas can be determined as $$\Delta Q = k(Re)^{\frac{1}{2}}$$
$$= k(VL/v)^{\frac{1}{2}}$$

where "V" is the velocity of gas, "Re" is the Reynolds number, and "$v$" is the coefficient of viscosity of gas.

Since the slits of the flow sensor are so narrow that they do not cause formation of any vortex flow of gas, the gas stream does not become vortex flow but is held in the state of laminar flow when clearing the slits. Thus, the relation between the temperature difference and the gas velocity can be derived easily from the above formula.

Further, the slits can present escapement of Joule heat generated in the thin film heater to the side of the substrate, and also it can prevent leakage of current through the thin film heater to the side of the substrate. It is thus possible to increase the accuracy of the flow sensor.

And in the flow sensor according to the invention, the direction of electric current through the thin film heater varies depending on whether the resistance temperature coefficient of the heater is positive or negative.

In case when the thin film heater has a positive resistance temperature coefficient, the thin film heater is disposed such that current flows in a direction of the gas stream.

In case when the thin film heater has a negative temperature coefficient, the thin film heater is disposed such that current flows in a direction perpendicular to the gas stream.

Now, the case when the temperature coefficient of the electric resistance of the thin film heater is positive (i.e., the electric resistance being increase with increasing temperature) will be considered. In this case, the thin film heater is disposed such that current flows along the gas stream.

The upstream side of the thin film heater is cooled by the gas stream, so that its temperature is reduced. The downstream side, on the other hand, is heated by heat carried along with the gas stream from the upstream side, so that the temperature is increase. Thus, in the current path along the gas stream the distributed resistance is reduced on the upstream side and increased on the downstream side. Thus, the heat generated is reduced on the upstream side to cause further temperature reduction, while it is increased on the downstream side to cause further temperature increase. A great temperature difference is thus produced between the upstream and down stream sides. This means an increase of the sensitivity of the flow sensor so that the flow sensor can detect even a slight flow velocity.

In case when the temperature coefficient of the electric resistance of the thin film heater is negative, the thin film heater is disposed such that current flows in a direction perpendicular to the gas stream.

Again in this case, the upstream side of the thin film heater is cooled by the gas stream, thus resulting in temperature reduction. On the downstream side, on the other hand, the temperature is increased by heat carried with the gas stream from the upstream side. Thus, the heater current can flow difficultly on the upstream side and easily on the downstream side. As a result, the heat generated is reduced on the upstream side, thus resulting in further temperature reduction. On the other hand, it is increased on the downstream side, so that the temperature is further increased. Thus, a great temperature difference is produced between the upstream and downstream sides.

Other objects and features of this invention will become understood from the following description with reference to the accompanying drawings.

DESCRIPTION OF THE PREFERRED EMBODIMENTS

Figure 1A:
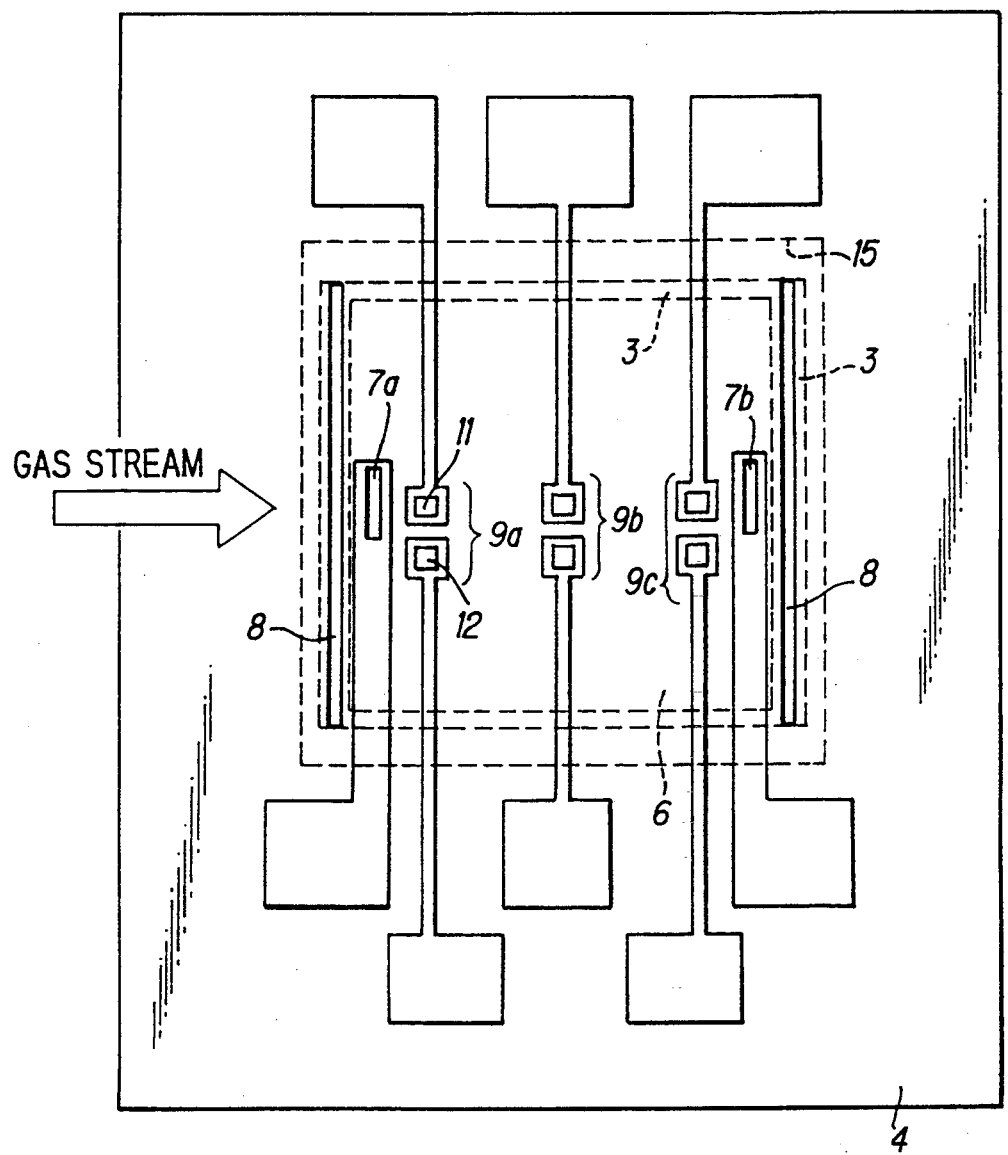
FIGS. 1(a) and 1(b) show a first embodiment of the flow sensor, in a plan view in (a) and in a sectional view in (b)
Figure 1B:
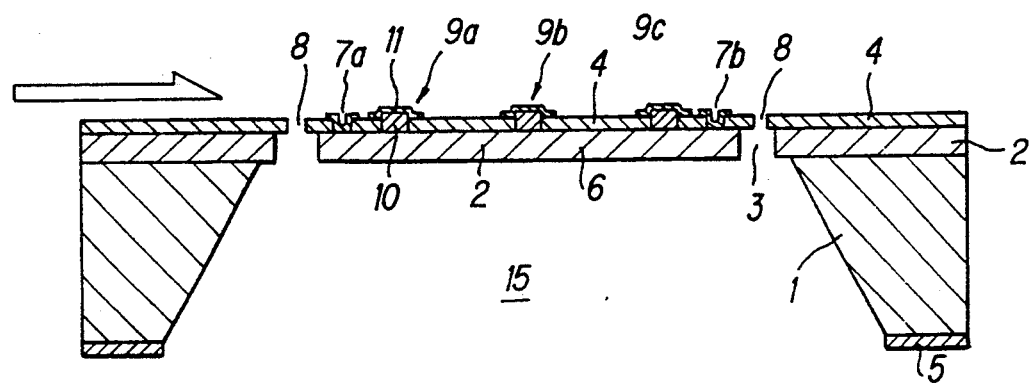

Referring to FIG. 1, on one surface of an n-type silicon substrate 1 is formed a high concentration boron-diffused single-stalline silicon layer 2 with high concentration boron of about $1 \times 10^{20} cm^{-3}$ using a coat diffusion source and its thermal diffusion. This layer has low electric resistance and thus can be utilized as a heater. In addition, it is of p++-Si (meaning high concentration p-type silicon), and at temperatures not higher than several hundred °C. it is metallic and has a positive electric resistivity temperature coefficient.

Boron is not doped to the entire surface of the n-type silicon substrate, but a rectangular frame-like is left, which is free from boron doping (the portion eventually becoming a groove 3).

Then, $SiO_2$ films 4 and 5 are formed by means of thermal oxidation on the opposite surfaces of the wafer, and an aperture or window is formed in the back side $SiO_2$ film. The n-type silicon substrate 1 is then anisotropically etched (anisotropic etching) to form a cavity 15 in it. The high concentration boron-diffused single-stalline silicon layer 2 is not attacked by the anisotropic etchant but is left in the form of a diaphragm atop the cavity 15. This layer is utilized as the thin film heater 6. The portion free from the boron doping is etched away to become the groove 3 to separate the thin film heater 6 and the surrounding high concentration boron-diffused single-stalline silicon layer 2.

Then, pair electrodes 7a and 7b are formed on the thin film heater 6 through small apertures or windows formed in the $SiO_2$ film 4. These electrodes 7a and 7b are formed on the upstream and downstream sides such that current passes through the thin film heater 6 along the gas stream.

Slits 8 are formed in the $SiO_2$ film 4 on the upstream and downstream sides of the thin film heater 6, thus thermally and electrically separating the thin film heater 6 and substrate 1. If the slits 8 are too wide, the gas flowing along the thin film heater becomes a vortex flow, thus making it impossible to determine the quantity of heat robbed by the gas from a simple formula. Accordingly, the width of the slits is less than one tenth of the film heater width between slits (the width of the slits is set to be as small as about 20 $\mu m$ for example).

Temperature sensors 9a to 9c are provided on the thin film heater on the upstream, central and downstream portions thereof along the gas stream. The temperature sensors may be of various types such as thermocouples. In this embodiment, they are p-n junction diodes. To form these p-n junction diodes, the $SiO_2$ film 4 on the thin film heater is formed with windows to expose the high concentration boron-diffused single-stalline silicon layer 2, and an n-type silicon layer 10 is epitaxially grown (epitaxial growth) on the exposed portions of the layer 2. Since the high concentration boron-diffused single-stalline silicon layer 2 as the thin film heater is of p-type, a p-n junction diode can be obtained by providing electrodes 11 and 12 to the n-type silicon layer 10 and high concentration boron-diffused single-stalline silicon layer 2, respectively. When the p-n junction diode is at 150° C. or more, its temperature can be detected from the temperature dependency of the reverse saturation current, and its sensitivity is very high. When it is used at temperatures below 100° C., the temperature at its junction can be determined from change in the forward current rising voltage.

And, it is possible to use a Schottky junction thermal sensor comprising a Schottky junction diode with a reverse voltage applied thereto to determine temperature from the temperature dependency of the reverse saturation current, said reverse voltage applied being set to be in an initial range such that the current flowing through said Schottky junction diode can be regarded as the reverse saturation current.

The central temperature sensor 9b monitors the temperature of the central portion of the thin film heater 6 and controls the current through the thin film heater such as to let the temperature be constant. In this state, the upstream and downstream side temperatures of the thin film heater 6 are measured with the temperature sensors 9a and 9b, and the velocity of gas is determined from the temperature difference.

The thin film heater has a positive temperature coefficient, and the lower the temperature, the lower the electric resistance. As shown in FIG. 1, with the same current, less power is consumed to generate less heat. With the same current, the downstream side is warmer than the upstream side. Thus, the electric resistance of the heater is higher, and more heat is generated. Thus, with the cooling of the upstream side with the gas stream, the heating of the heater is reduced to further reduce the temperature. The situation is converse on the downstream side. This leads to a great temperature difference between the upstream and downstream sides. It is thus possible to detect the gas stream with high accuracy.

Figure 2A:
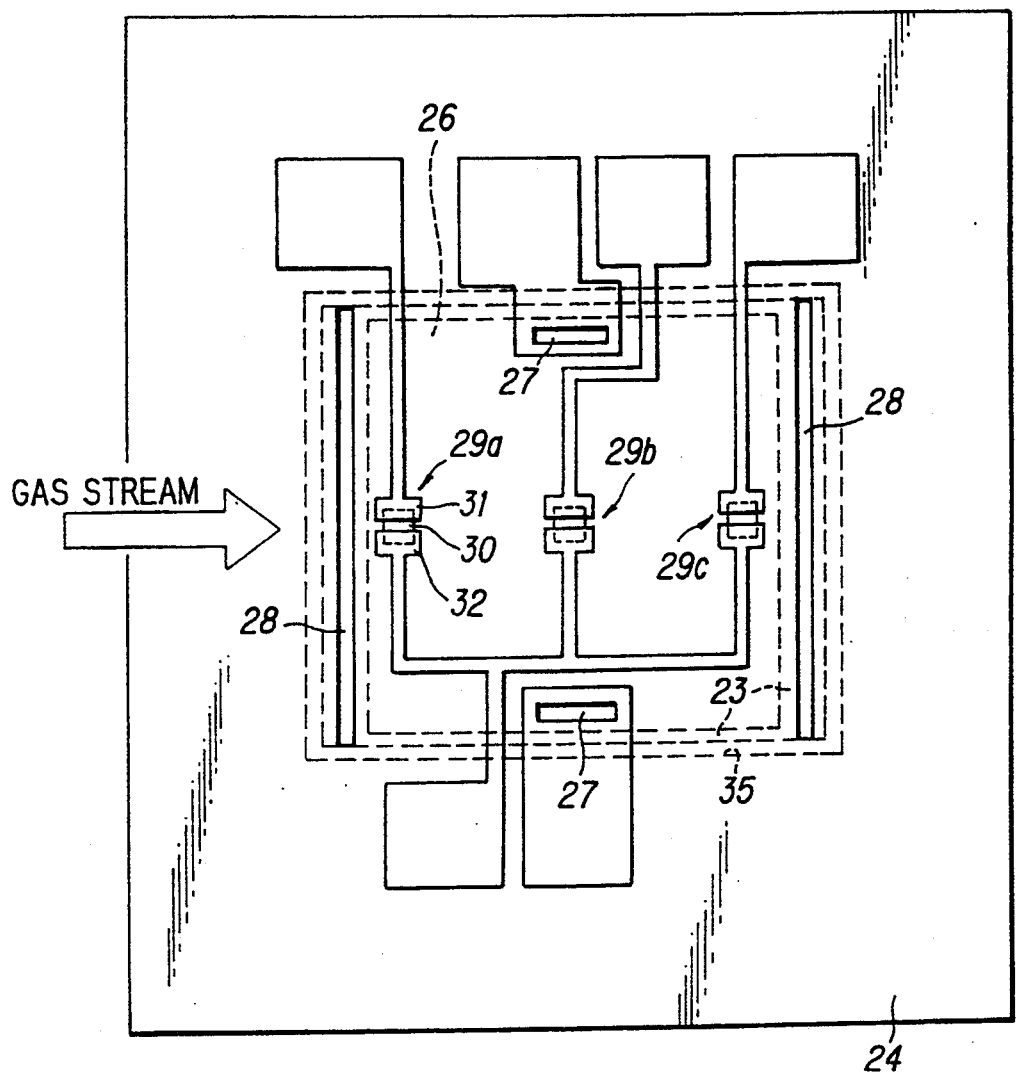
FIGS. 2(a) and 2(b) are a second embodiment of the flow sensor, in a plan view in (a) and in a sectional view in (b).
Figure 2B:
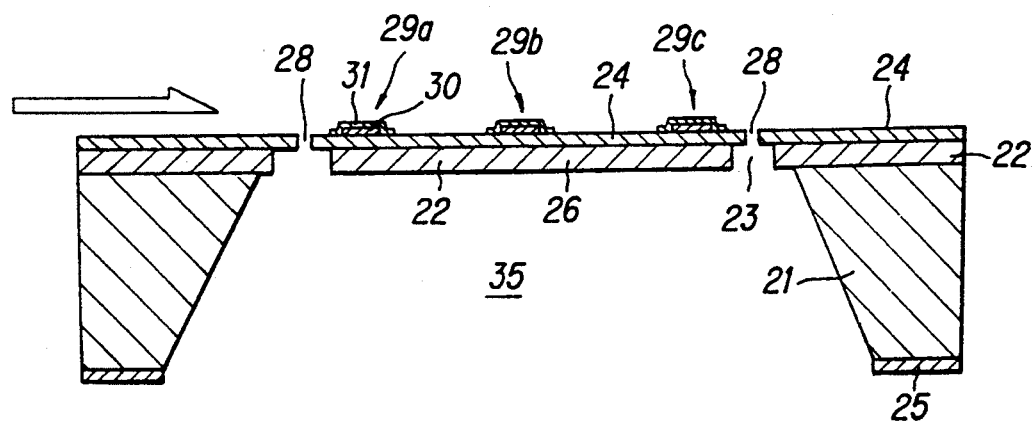

FIG. 2 shows another embodiment, in which the resistance temperature coefficient of the thin film heater is negative. An n-type silicon layer 22 (with a thickness of about 3 $\mu m$) is formed epitaxially on the p-type silicon substrate. Then, a rectangular frame-like p-type silicon region is formed by thermally diffused boron in the n-type silicon layer 22 (the region eventually becoming a groove 23).

$SiO_2$ films 24 and 25 are formed by means of thermal oxidation on the opposite surfaces of the wafer, and the back side film 25 is formed with an aperture or a window. The system is then electrochemically etched in an aqueous solution containing about 50% caustic soda at 60° C. such that the n-type epitaxial layer 22 is positive. In this way, the p-type silicon substrate 21 is etched anisotropically to form a cacity 35, leading an n-type silicon layer 22 like a diaphragm atop the cavity. This diaphragm is utilized as a thin film heater 20. This thin film heater has a negative temperature coefficient.

The boron-diffused region is etched to form a groove 23 so as to separate the thin film heater and the surrounding n-type epitaxial layer 22.

Electrodes 27 are provided such that they face each other on the opposite sides of flow of the fluid so that current flows in a direction perpendicular to the direction of the fluid.

Slits 28 are formed in the manner as in FIG. 1.

Temperature sensors 9a to 9c formed on the thin film heater 26 may be of any kind. In this instance, semiconductor thermistors are used. They are formed by forming a germanium layer 3 by spattering germanium to a thickness of about 0.2 μm and carrying out a heat treatment in $N_2$ at 400° C. and attaching electrodes 31 and 32 to the germanium layer 30. They are suited for use at a temperature of 100° C. or below.

This thin film heater 26 has a negative temperature coefficient. Thus, its electric resistance is increased with temperature fall. In addition, since the direction of current flowing through the thin film heater is perpendicular to the gas stream, the downstream side thereof is cooled to increase the distributed resistance of the heater, making it difficult for the current to flow on the upstream side. Thus, on the upstream side of the thin film heater the heat generation is suppressed. Meanwhile, the downstream side is warmed up by the movement of heat with the gas stream, thus reducing the resistance and causing extra current. Thus, heat generated is increased correspondingly.

Thus, more cooling takes place at the upstream side temperature sensor 29a, and more heating takes place at the downstream side sensor 29c, thus increasing the temperature difference between the two temperature sensors to increase the sensitivity.

The central temperature sensor 29b monitors the temperature of the central part of the thin film heater.

As has been described in the foregoing, according to the invention the thin film heater is provided with the upstream and downstream side slits. It is thus possible to prevent escapement of Joule heat generated in the thin film heater to the side of the substrate and also prevent leakage of current through the thin film heater to the side of the substrate, thus permitting improvement of the accuracy of the flow sensor.

Further, the slits are sufficiently narrow to prevent a vortex flow of gas, and thus the gas stream does not become a vortex flow but is held to be a laminar stream when clearing the slits. It is thus possible to obtain the relation between the temperature difference between the upstream and downstream sides of the thin film heater and the gas velocity from a simple formula.

Furthermore, as has been described in the foregoing, according to the invention in the case of positive resistance temperature coefficient of the thin film heater the thin film heater is disposed such that current flows along the gas stream, while in the case of the negative resistance temperature coefficient the thin heater is disposed such that current flows in a perpendicular direction to the gas stream. In this case, greater heat is generated on the downstream side of the thin film heater than on the upstream side, and thus a great temperature difference between the upstream and downstream sides of the thin film heater can be obtained to high sensitivity.

It is possible to dispose a third temperature sensor between the upstream and down stream temperature sensors to monitor the temperature of the central portion of the thin film heater and control the current through the thin film heater such that the temperature of the central portion is substantially constant. In this case, the condition of heat radiation is constant, thus facilitating the calibration.

Although the invention has been described with respect to specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A flow sensor comprising temperature sensor means for detecting temperatures of upstream and downstream sides of a thin film heater exposed to a gas stream to detect the velocity of the gas from the temperature difference between the upstream and downstream temperatures of said thin film heater measured by said temperature sensor means, said thin film heater being formed atop a cavity formed in a substrate, said thin film heater having slits formed on the upstream and downstream sides to separate said thin film heater and said substrate from each other, said slits having a small width in comparison to the width of the thin film heater such as to be able to maintain a laminar state of the gas stream and said temperature sensor means being located between the upstream and downstream sides.

2. The flow sensor according to claim 1, wherein said slits thermally and electrically separate said thin film heater and said substrate from each other.

3. The flow sensor according to claim 1, wherein said slits have a width less than one tenth of the film heater width between slits.

4. The flow sensor according to claim 1, wherein said temperature sensor means is a p-n junction diode.

5. The flow sensor according to claim 1, wherein said temperature sensor means is a semiconductor thermistor.

6. A flow sensor having a thin film heater and an upstream temperature sensor and downstream temperature sensor disposed on said heater, for detecting the flow velocity of a gas stream from a temperature difference between an upstream side and a downstream side temperature of the thin film heater exposed to the gas stream by measuring said upstream side temperature with the upstream temperature sensor and said downstream side temperature with the downstream temperature sensor, wherein the improvement comprises said thin film heater having a positive resistance temperature coefficient and electrodes for providing electrical current through said heater, and said thin film heater being disposed such that said electrical current flows therethrough in a direction parallel to the gas stream.

7. A flow sensor having a thin film heater and upstream temperature sensor and downstream temperature sensor disposed on said heater, for detecting the flow velocity of a gas stream from a temperature difference between an upstream side and a downstream side temperature of the thin film heater exposed to the gas stream by measuring said upstream side temperature with the upstream temperature sensor and said downstream side temperature with the downstream temperature sensor, wherein the improvement comprises said thin film heater having a negative resistance temperature coefficient and electrodes for providing electrical current through said heater, and said thin film heater being disposed such that current flows therethrough in a direction parallel to the gas stream.

8. The flow sensor according to one of claims 6 or 7, wherein said improvement further comprises a further temperature sensor disposed between the upstream and downstream temperature sensors for measuring the temperature of a central portion of said thin film heater, the electrical current flowing through said thin film heater being such that the temperature of said central portion is substantially constant.

* * * * *